Sept. 25, 1956     M. J. SCHULTZ     2,764,194
WHEEL OR RIM HOLDING STAND
Filed Aug. 29, 1952     2 Sheets-Sheet 1
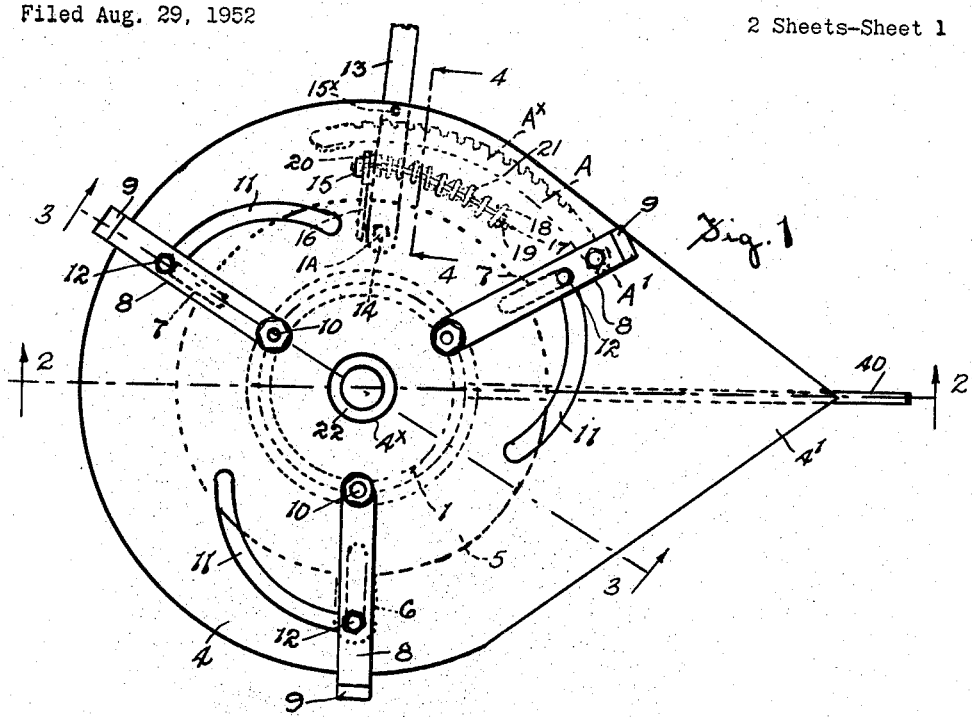
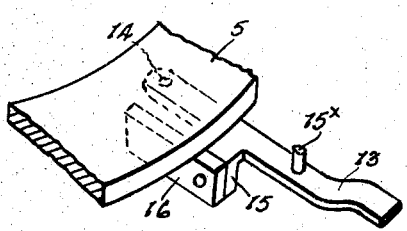
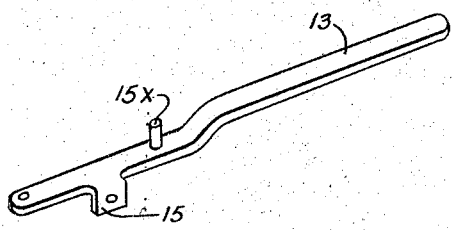
Inventor
M. J. Schultz
By J. S. Roxburgh
His Atty Sept. 25, 1956
M. J. SCHULTZ
2,764,194
WHEEL OR RIM HOLDING STAND
Filed Aug. 29, 1952
2 Sheets-Sheet 2
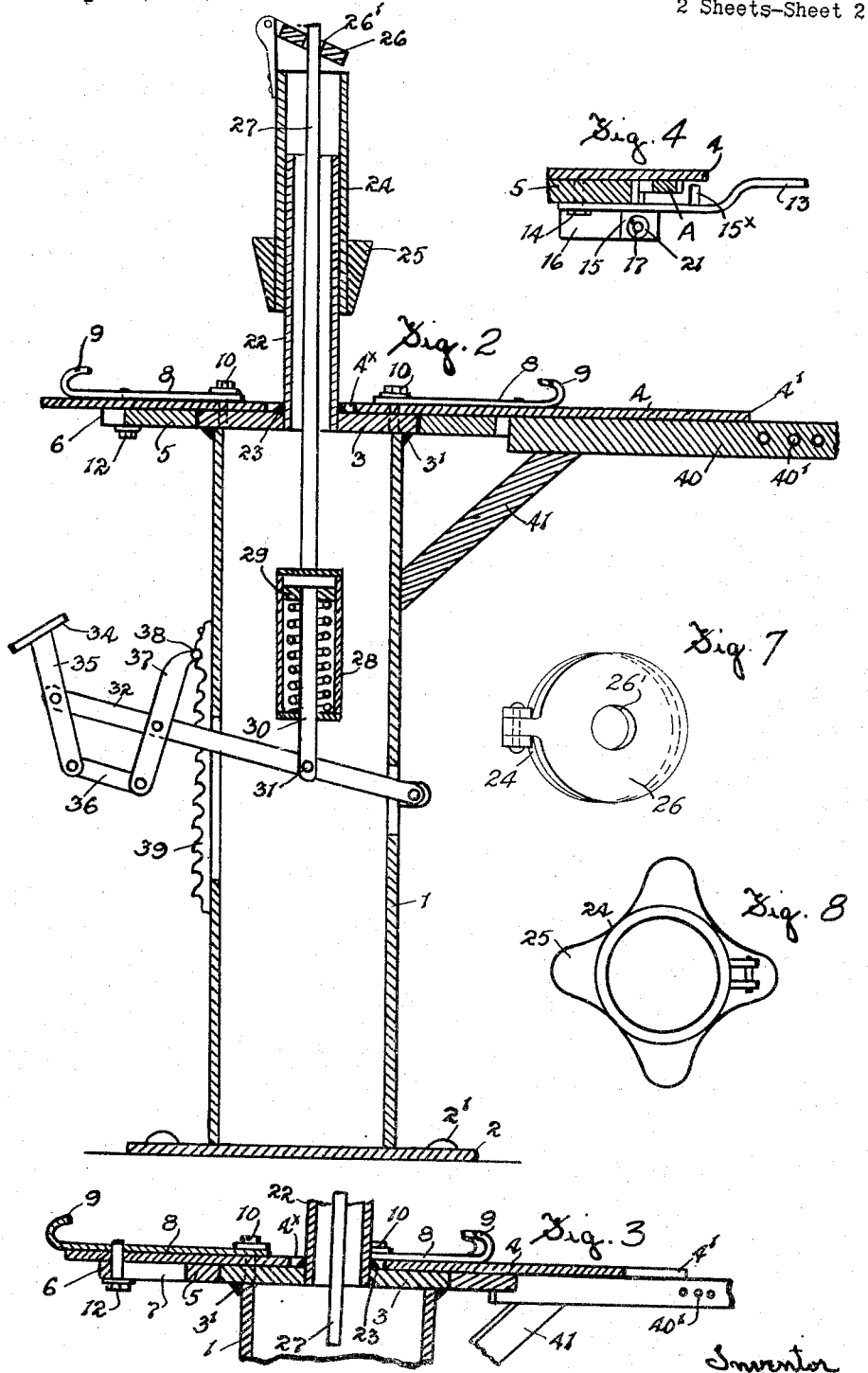
Inventor
M. J. Schultz
By G. S. Roxburgh
His Atty United States Patent Office 2,764,194
Patented Sept. 25, 1956

2,764,194

WHEEL OR RIM HOLDING STAND

Matthew J. Schultz, Winkler, Manitoba, Canada, assignor to Steelman, Inc., Hallock, Minn.

Application August 29, 1952, Serial No. 306,991

3 Claims. (Cl. 144—288)

This invention relates to an improvement in the type of tire tool shown and described in my prior patent application filed under Serial Number 275,649 on March 8, 1952, which became Patent No. 2,708,954, issued May 24, 1955, and the objects of the invention are as follows.

The general object of the invention is to provide a tire tool on which all tire removing operations can be done quickly and with little effort and regardless of the size of the wheel and tire on which the work is to be done.

A further object is to provide a work table mounted on a suitable stand and having an area sufficiently large to support the largest size of automobile or truck wheel and tire now commercially produced and to provide the table with a plurality of jaws which can be readily set by a hand control lever to tightly grip the under flange of the rim of any wheel placed on the table whether it be large or small.

A further object is to provide spring means, acting subsequently to the gripping of the rim flange by the jaws, to apply a heavy spring pressure on the rim flange through the jaws and as the jaw control lever is pressed to its final position.

A further object is to supply the head plate of the stand with an upstanding hollow post to slidably receive a removable sleeve, to supply the sleeve with a tapered pressure applying plug and to supply means actuated by a foot pedal to down press the sleeve in the down movement of the pedal.

A further object is to introduce a pressure spring in the actuating connections between the pedal and sleeve, to become compressed in the down movement of the pedal.

A further object is to provide a bar and brace reinforcing the work table, the bar extending beyond the table and having its projecting end supplied with a series of openings to receive the attachment of a bead breaking tool.

A further object is to provide the upper end of the carrying plug sleeve with a pivoted friction disc engageable with a central rod connected to the foot pedal and through which down pressure is applied on the rod in the down pressing of the pedal.

With the above more important objects in view the invention consists essentially in the arrangement and construction of parts hereinafter described, reference being had to the accompanying drawings in which:

Fig. 1 is a plan view of the tire tool, the sleeve carrying plug having been removed.

Fig. 2 is a vertical cross sectional view at 2—2, Fig. 1.

Fig. 3 is a vertical cross sectional view at 3—3, Fig. 1.

Fig. 4 is a vertical cross sectional view at 4—4, Fig. 1.

Fig. 5 is a perspective view of the lever used for actuating the pivoted jaws.

Fig. 6 is a perspective view of a portion of the annular plate and showing a part of the lever and the lug attached to the annular plate and opposing the lever lug.

Fig. 7 is an enlarged plan view of the rod locking disc and the underlying sleeve.

Fig. 8 is an enlarged plan view of the plug and its sleeve.

In the drawings like characters of reference indicate corresponding parts in the several figures.

In carrying out the present invention I supply a support member which includes a tubular stand or pedestal 1 and table or platform 4 which is affixed to pedestal 1. Pedestal 1 is of convenient height and has a base plate 2 permanently secured thereto as by welding and which plate can be bolted firmly to a floor, by screws or bolts 2'. The upper end of the stand 1 is permanently closed by a head plate 3 welded at 3' to the stand. Work table 4 is disposed horizontally on top of pedestal 1 and is for the greater part circular but is formed with a projecting, pointed, side extension 4' as clearly shown in Fig. 1.

A rigid interconnecting element or annular plate 5 is mounted beneath table 4 for rotation about a vertical axis extending generally centrally through stand 1. Plate 5 is supplied at its outer circumference, and in the present instance, with similar radial extensions or ears 6 which are positioned 120 degrees apart and which are all provided with similar slots 7 extending generally radially from the rotation axis of the annular plate 5.

On top of the table, I locate, in the present instance, three similar pressure bars 8 the outer ends of which are supplied with up-turned rim flange gripping jaws 9 which face generally inwardly toward the rotation axis of plate 5. The inner ends of bars 8 are pivotally connected in spaced relation with the rotation axis of plate 5 and with each other, to table 4 by similar cap screws 10 positioned 120 degrees apart for movement in a plane which extends transversely of the rotation axis of plate 5. Jaws 9 are thereby shiftable toward and away from said axis.

The table is supplied, also, in the present instance, with three similar arcuate slots 11 formed concentric to the cap screws 10, and which slidably receive similar cap screws 12 passing upwardly through the slots 7 of the ears 6 and the slots 11 of the table 4 and have their upper ends tightly screw threaded into the several pressure bars 8. The above arrangement is such that should the annular plate 5 be rotated in a clockwise direction, from the position shown in Fig. 1, the slots 7 and 11 and the screws 12 will cause the simultaneous, clockwise turning of the pressure bars on the work table 4 about their respective pivoting screws 10. As said pressure bars 8 are so rotated, their jaws 9 swing in towards the vertical axis of the stand with the result that provision is made for gripping the under flanges of various diameter wheel rims, placed on the table 4. The jaws 9 also center all wheels placed on the table.

While I have shown and described three gripping bars 8 mounted and operating as described, it will be understood that their number could be increased if found desirable and without departing from the spirit of the invention.

It is desirable to supply a handle 13 for the operator, for rotating the annular plate 5 and also to supply a pressure spring 21 which will become compressed in the manipulation of the handle, subsequent to the time the jaws 9 have gripped the flange of the rim. To this end I have devised the following parts.

The handle for the operator, indicated at 13, normally extends radially outwardly from a pivot or cap screw 14 secured to the underside of the plate 5. The handle 13 is provided with a downwardly extending lug 15 positioned normally in facial contact with a second lug 16 which is affixed to the plate 5 and which is disposed radially outwardly of the rotation axis of plate 5 from the pivot 14. A resiliently yieldable element or spring 21 reacts between lug 16 and lug 15 to restrict relative movement thereof and to restrict swinging of handle 13 with respect to plate 5. A bolt 17 extends through suitable holes provided in lugs 15 and 16 and has a nut 20 secured thereon which abuts the outer side of lug 16.

Lug 15 is slidable with respect to bolt 17. Spring 21 is carried on bolt 17 and is retained thereon by washer 18 and nut 19 disposed in spaced relation with lug 16. One end of spring 21 abuts washer 18 and the other end abuts lug 15.

Should the handle 13 be turned in a clockwise direction, as seen in Fig. 1, without any back pressure on the jaws of the pressure bars, annular plate 5, lug 16, lug 15, bolt 17, spring 21 and handle 13 will move about the rotation axis of annular plate 5, and there will be no relative movement between any of these parts and the pressure bars 8 will move or turn freely inwardly. On the other hand, however, should there be a wheel on the table when handle 7 is turned in a clockwise direction, the jaws 9 will move in until they engage the rim flange of the wheel rim, whereupon jaws 9, annular plate 5, lug 16 and bolt 17 will be restricted from further clockwise rotation. With further clockwise urging of handle 13, handle 13 will tend to swing about pivot 14 in a clockwise direction causing spring 21 to be compressed as lug 15 slides along the bolt 17 away from lug 16 and as a result force will be transmitted through lug 15 and spring 21 and bolt 17 to lug 16 tending to turn the same in a clockwise direction about the rotation axis of plate 5. As handle 13 is turned about pivot 14 against the force of spring 21, substantially equal and opposite forces will be exerted by handle 13 on pivot 14 and lug 16. Because lug 16 is disposed farther out from the rotation axis of plate 5 than is pivot 14, the moment of force developed at lug 16 with reference to the rotation axis of plate 5 is greater than the moment of force developed on pin 14 with respect to the rotation axis of plate 5. As a result, the annular plate 5 will be urged in a clockwise direction due to the influence of the torque or moment of force exerted at lug 16 and the jaws 9 will be urged into tightly gripping engagement with the wheel rim. The force exerted on the wheel rim by the ajws 9 is increased as more pressure is applied to handle 13 in the clockwise direction and as spring 21 is compressed.

Means is supplied for locking the lever 13 in the final gripping positions of the jaws 9 and in the present instance comprises the parts now described. A bar or locking lever A is pivotally secured by a cap screw A' to the underside of the table and has the side remote from the plate 5 supplied with a series of ratchet teeth A$^x$ any one of which can become engaged with a locking pin 15$^x$ secured to and extending upwardly from the top side of the lever 13. The teeth are so shaped that when engaged with the pin they lock the lever securely in its final flange gripping position.

It will be seen from the above description that the jaws 9 will freely turn inwardly in the initial turning of the handle 13, such free movement continuing until the tire flange is gripped by the jaws 9, and that thereafter the further movement, to the right, of the handle 13, compresses the spring 21 and brings heavy pressure to bear on the flange gripped by the jaws 9. The out and in limiting positions of the pressure applying jaws are such that the tool can be used to effectively grip the present day range of varying diameters of automobile and truck wheels.

I have found, particularly with the larger sized and heavier wheels, that when the heavier work of removing a tire from the jaw gripped rim flange is being done, there is sometimes a tendency to lateral slippage of the rim flange in the jaws and consequently to insure against such, I have provided a pedal actuated, pressure exerting plug to become engaged with the central opening in the hub of the wheel. This plug and its associated parts are now described.

The head plate 5 is provided with a central opening to receive the lower end of a hollow, vertical post 22 of predetermined length, the post passing through a suitable opening 4$^x$ made in the table and being securely welded at 23 to the head plate. On the post I slidably mount a sleeve 24 the lower end of which is supplied with a tapered pressure plug 25 and the upper end of which pivotally carries a friction disc 26. A rod 27 passes centrally and downwardly through the post and has a cylinder 28 permanently secured thereto. Within the cylinder is a piston like head 29 secured to the upper end of a rod 30 and the latter rod passes slidably through the lower end of the cylinder and is pivotally secured at 31 to the pedal 32. A compression spring 33 is located in the cylinder between the head 29 and the lower end of the cylinder. The friction disc 26 is supplied with a central hole 26' which receives the upper end of the rod 27 and the arrangement is such that the disc opening 26', in a canted position, such as shown in Fig. 2, bites the rod in a down movement of the rod and so causes the down movement of the plug carrying sleeve. As rod 27 is urged downwardly, it urges disc 26 to a steeper inclination and the disc then tightens its grip on the rod.

The foot pedal and the exterior parts associated therewith and which embody the foot plate 34, pivoted side arms 35, link 36, pivoted levers 37, catch pin 38 and toothed bars 39 are not herein described in detail as all such are identical to corresponding parts shown and fully described in my pending application hereinbefore mentioned and their operation is the same.

The extension 4' of the table is reinforced by a radial bar 40 welded to the underside of the table 4 and extension 4' and braced by a brace 41 welded to the stand and to the bar 40. The outer end of the bar 40 extends beyond the table and is supplied with a series of adjusting openings 40' adapted to receive a pivot pin for securing a bead breaking tool to the bar. Such a tool is fully shown and described in the application hereinbefore referred to.

What I claim as my invention is:

1. In a tire tool, in combination, an upstanding pedestal, a stationary, horizontally disposed work table mounted on the upper end of the pedestal to receive and support a wheel rim, a plurality of similar, outwardly extending bars mounted on the upper face of the table and having their inner ends pivoted to the table and their outer ends provided with upstanding jaws to engage the lower flange of the rim placed on the table within the jaws, said pivot points of the jaws being equally spaced from and concentric to a vertical axis and said table being provided with arcuate slots concentric to said pivot points, a turnable annular plate underlying the table and concentric to said vertical axis, said plate being provided with a plurality of radial slots, cap screws passing upwardly through the slots of the plate and table and secured to the bars and supporting the plate and manually actuated means for rotating the plate.

2. In a tire tool, in combination, an upstanding pedestal, a stationary, horizontally disposed work table mounted on the upper end of the pedestal to receive and support a wheel rim, a plurality of similar, outwardly extending bars mounted on the upper face of the table and having their inner ends pivoted to the table and their outer ends provided with upstanding jaws to engage the lower flange of the rim placed on the table within the jaws, said pivot points being equally spaced from and concentric to the vertical axis of the pedestal and said table being provided with similar slots concentric to said pivot points, a turnable annular plate underlying the table and concentric to the vertical axis of the pedestal, said plate being provided with a plurality of radial slots, cap screws extending upwardly through the slots of the plate and table and secured to the bars and supporting the annular plate, an outwardly extending hand lever having its inner end pivotally secured to the annular plate, a compression spring resisting pivotal movement, in one direction of the lever in relation to the plate and means for releasably locking the lever in various turned positions to the table.

3. Apparatus for holding a wheel having a flanged rim comprising a support member, a rigid interconnecting element mounted on said support member for movement about an axis and having a plurality of elongated slots therein extending generally radially from said axis, a plurality of jaws pivotally secured to said support member in spaced relation with said axis and in spaced relation with each other for movement in a plane extending transversely of said axis and toward and away from the same, said jaws facing generally inwardly toward said axis for gripping the rim flange of such a wheel, a plurality of guide elements each secured to a respective jaw and being shiftably mounted in a corresponding slot of said rotatable interconnecting element, an elongated handle extending generally outwardly from said interconnecting element and being pivotally connected thereto for movement in a plane extending transversely of said axis, a resiliently yieldable element reacting between said handle and said interconnecting element and being arranged for restricting swinging movement of said handle with respect to said interconnecting element, and releasable means for holding said handle in predetermined positions with respect to said support member, whereby swinging of said handle after said jaws have engaged the rim flange of such a wheel will cause the jaws to tighten their grip on the rim flange and permit the handle to be retained with respect to said support member in wheel-locking position.

References Cited in the file of this patent

UNITED STATES PATENTS

| | | |
|---|---|---|
| 1,069,824 | Smith | Aug. 12, 1913 |
| 1,462,455 | Larson | July 17, 1923 |
| 1,713,511 | Cadwallader | May 21, 1929 |
| 1,793,864 | Manley | Feb. 24, 1931 |
| 2,057,200 | McCarthy | Oct. 13, 1936 |
| 2,171,282 | Wochner | Aug. 29, 1939 |
| 2,197,808 | Mason | Apr. 23, 1940 |
| 2,351,355 | Merrett | June 13, 1944 |
| 2,505,172 | Coats | Apr. 25, 1950 |
| 2,569,788 | Weaver | Oct. 2, 1951 |